US008767163B2

(12) United States Patent
Seo et al.

(10) Patent No.: US 8,767,163 B2
(45) Date of Patent: Jul. 1, 2014

(54) METHOD OF FABRICATING AN LCD DEVICE USING FLEXIBLE SUBSTRATES

(75) Inventors: Hyun-Sik Seo, Annyang-si (KR);
Seung-Han Paek, Incheon (KR);
Dae-Hyun Nam, Goyang-si (KR);
Nack-Bong Choi, Suwon-si (KR)

(73) Assignee: LG Display Device Co., Ltd., Seoul (KR)

( * ) Notice: Subject to any disclaimer, the term of this patent is extended or adjusted under 35 U.S.C. 154(b) by 73 days.

(21) Appl. No.: 12/827,299

(22) Filed: Jun. 30, 2010

(65) Prior Publication Data

US 2010/0267306 A1 Oct. 21, 2010

Related U.S. Application Data

(62) Division of application No. 11/451,643, filed on Jun. 13, 2006, now Pat. No. 7,773,193.

(30) Foreign Application Priority Data

Jun. 30, 2005 (KR) .............................. 2005-0057533

(51) Int. Cl.
*G02F 1/1333* (2006.01)
*G02F 1/13* (2006.01)

(52) U.S. Cl.
USPC ......................................... 349/158; 349/187

(58) Field of Classification Search
USPC ........................................................ 349/158
See application file for complete search history.

(56) References Cited

U.S. PATENT DOCUMENTS

| 2,901,850 | A | 9/1959 | Knox | |
|---|---|---|---|---|
| 6,012,509 | A | 1/2000 | Nonaka | |
| 6,294,722 | B1 * | 9/2001 | Kondo et al. | 136/244 |
| 6,508,885 | B1 | 1/2003 | Moslehi et al. | |
| 7,545,162 | B2 * | 6/2009 | Chung | 324/760.01 |
| 2003/0147038 | A1 * | 8/2003 | Lee et al. | 349/187 |
| 2004/0129384 | A1 * | 7/2004 | Tomari | 156/345.11 |
| 2004/0134363 | A1 * | 7/2004 | Saiki et al. | 101/129 |
| 2004/0206308 | A1 * | 10/2004 | Ahn et al. | 118/723 MP |
| 2005/0015976 | A1 * | 1/2005 | Hirano | 29/854 |
| 2005/0057717 | A1 | 3/2005 | Rho | |
| 2005/0221015 | A1 * | 10/2005 | Ivanov et al. | 427/443.1 |
| 2006/0113185 | A1 * | 6/2006 | Kuriyama et al. | 204/275.1 |

FOREIGN PATENT DOCUMENTS

| CN | 1504070 | 6/2004 |
|---|---|---|
| CN | 1607892 A | 4/2005 |
| JP | 3/99499 | 4/1991 |
| JP | 8-264996 | 10/1996 |
| TW | 436631 | 5/2001 |
| TW | M258674 | 3/2005 |

OTHER PUBLICATIONS

Office Action issued in corresponding Taiwan Patent Application No. 095121300, mailed Apr. 19, 2011.
Notification of Office Action (Chinese).
Notification of Office Action (English Version).

\* cited by examiner

*Primary Examiner* — Bumsuk Won
*Assistant Examiner* — Charles Chang
(74) *Attorney, Agent, or Firm* — Brinks Gilson & Lione

(57) ABSTRACT

A jig for a flexible substrate comprises a glass plate having a concave portion and a plurality of grooves at periphery of the concave portion. The jig further comprises a plurality of fixing elements inserted in the plurality of grooves to fix the flexible substrate to the glass plate.

2 Claims, 7 Drawing Sheets

METHOD OF FABRICATING AN LCD DEVICE USING FLEXIBLE SUBSTRATES

The present patent document is a divisional of U.S. patent application Ser. No. 11/451,643, filed Jun. 13, 2006, which claims priority to Korean Patent Application No. 2005-0057533 filed in Korea on Jun. 30, 2005, which is hereby incorporated by reference.

BACKGROUND

1. Field of the Invention

The present invention relates to a liquid crystal display device, more particularly, to a jig for a flexible substrate, method of fabricating the same and a liquid crystal display device using the same preventing the flexible substrate waving in a process of a liquid crystal display device.

2. Discussion of the Related Art

Since a liquid crystal display (LCD) device has characteristics of light weight, thinness and low power consumption, the LCD device has been widely used as a substitute for a display device of cathode-ray tube type. The LCD device includes first and second substrates that face each other. A liquid crystal layer is interposed between the first and second substrates. The LCD device uses optical anisotropy and polarization properties of liquid crystal molecules to display images. The LCD device includes a switching element, a pixel electrode, a common electrode, a color filter and so on. Particularly, the LCD device including a thin film transistor (TFT) as a switching element, referred to as an active matrix LCD (AM-LCD) device, has excellent characteristics of high resolution and displaying moving images.

Generally, the LCD device uses a glass plate as a substrate. However, since the glass plate is hard and has heavy weight, it is difficult for the glass plate to be used for fabricating a mobile instrument such as a mobile phone and a personal digital assistant (PDA). In addition, the substrate made of the glass plate is likely to break down by impacts.

To resolve the above problems, the LCD device using a flexible substrate is suggested. The flexible substrate is made of a transparent plastic plate, such as polyethylene phthalate, polyether sulfone, polyimide and so on, which has light weight and strength against impacts. The flexible substrate has a relatively lower transition temperature than the glass substrate, but the flexible substrate has advantages of lightness and flexibility. Unfortunately, the flexible substrate has several problems in the process of fabricating the LCD device. The flexible substrate waves during the process due to flexibility, and thus an adhesion-transferring method using a bonding agent fixing the flexible substrate to the glass plate is applied.

FIG. 1 is a schematic cross-sectional view of a flexible substrate after an adhesion-transferring method according to the related art. As shown in FIG. 1, in the adhesion-transferring method, the bonding agent is coated on the glass plate to form a bonding agent layer 30 and the flexible substrate 20 is disposed on the bonding agent layer 30. Accordingly, the glass plate 10, the bonding agent layer 30 and the flexible substrate 20 is sequentially laminated. Not shown in FIG. 1, the bonding agent layer 30 includes upper and lower layers. Because the bonding agent layer 30 should not be separate from the glass plate, the upper portion, which clings to the glass plate 10, has a strong adhesive strength than the lower portion. In contrast, the lower portion has a relatively weak adhesive strength to separate the flexible substrate from the bonding agent layer 30 after the fabricating process. The flexible substrate 20 is fixed to the glass plate 10, transferred into the fabrication process of the LCD device and fixed.

However, since the flexible substrate is fixed to the glass plate using double layers of the bonding agent, the fabricating process becomes complicated. Also, since bubbles are contained between the flexible substrate and the bonding agent layer, production yield decreases. Since the bonding agent layer has double-layered type, it is difficult to select the bonding agent.

BRIEF SUMMARY

Accordingly, the present invention is directed to a jig for fixing a flexible substrate and a method of fabricating the same that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

A jig for a flexible substrate comprises a glass plate having a concave portion and a plurality of grooves at periphery of the concave portion. The jig further comprises a plurality of fixing elements inserted in the plurality of grooves to fix the flexible substrate to the glass plate. The jig can contain a plurality of protrusions protruding from sidewalls of the concave portion, wherein the flexible substrate is disposed in the concave portion and is fixed using the plurality of protrusions.

In another aspect of the present invention, a jig for a flexible substrate comprise a lower plate having a concave portion and an upper plate having a hole of a smaller size than the concave portion, wherein the lower plate combines with the upper plate such that the concave portion faces either the upper plate or the lower plate.

In another aspect of the present invention, a method of fabricating a jig for a flexible substrate comprises forming a concave portion in a glass plate. The method further comprises either forming a plurality of grooves at periphery of the concave portion or forming a plurality of protrusions protruding from sidewalls of the concave portion.

In another aspect of the present invention, a method of fabricating a jig for a flexible substrate comprises forming a concave portion in a lower plate; forming a hole in an upper plate corresponding to the concave portion. The method further comprises combining the lower plate with the upper plate such that the concave portion faces either the hole or the lower plate.

In another aspect of the present invention, a method of fixing a flexible substrate to a glass plate comprises disposing the flexible substrate in a concave portion on the glass plate. The method further comprises inserting a plurality of fixing elements in a plurality of grooves at periphery of the concave portion such that the each fixing elements overlaps the flexible substrate.

In another aspect of the present invention, a method of fixing a flexible substrate to a glass plate comprises inserting the flexible substrate in a cavity of the glass plate through an opening on a sidewall of the cavity such that a hole of cavity exposes the flexible substrate; and sealing the opening.

In another aspect of the present invention, a method of fabricating a liquid crystal display device using first and second flexible substrates comprises preparing fixing plates having a concave portion and a plurality of grooves at periphery of the concave portion, then disposing the first and second flexible substrates in the concave portion, respectively, and followed by inserting a plurality of fixing elements in the plurality of grooves such that the each fixing element overlaps the first and the second flexible substrates, respectively. Alternatively the liquid display devices can be fabricated by preparing fixing plates having a cavity, a hole of the cavity and an opening on a sidewall of the cavity, then disposing the first and second flexible substrates in the cavity through the opening such that the hole expose the first and second flexible substrates, respectively, and followed by sealing the opening.

The method of fabricating liquid crystal device further comprises forming an array substrate structure on the first flexible substrate, forming a color filter substrate structure on the second flexible substrate; separating the first and second flexible substrates from the fixing plates, attaching the first and second flexible substrates, and forming a liquid crystal layer between the first and second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE DRAWINGS AND THE PRESENTLY PREFERRED EMBODIMENTS

Reference will now be made in detail to the preferred embodiments, examples of which are illustrated in the accompanying drawings.

Figure 1:
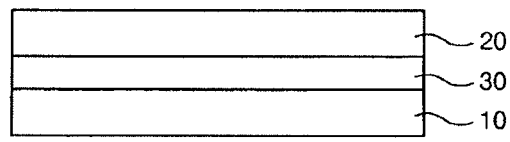
FIG. 1 is a schematic cross-sectional view of a flexible substrate after an adhesion-transferring method according to the related art.
Figure 2A:
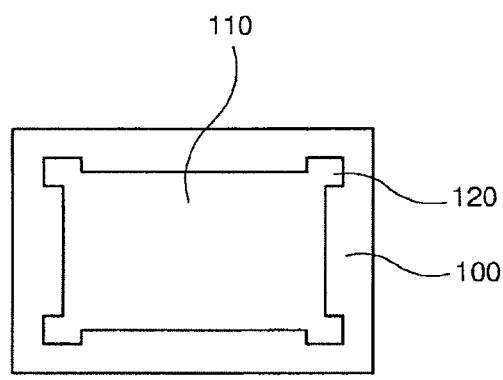
FIGS. 2A and 2B are schematic plane views showing a jig according to an exemplary embodiment of the present invention.
Figure 2B:
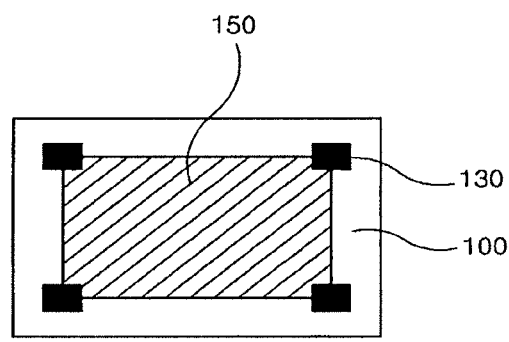

FIGS. 2A and 2B are schematic plane views showing a jig for a flexible substrate according to an exemplary embodiment according to the present invention. As shown in FIGS. 2A and 2B, the jig for the substrate includes a glass plate 100 and plurality of fixing elements 130. The glass plate 100 has a concave portion 110 and a plurality of grooves 120. The concave portion 110 and the plurality of grooves 120 may be formed on the glass plate 100 by simultaneously etching the glass plate 100. The concave portion 110 has substantially the same shape and area as the flexible substrate 150 so that the flexible substrate 150 is disposed in the concave portion 110. For example, when the flexible substrate 150 has a rectangular shape, the concave portion 110 also has the rectangular shape. The plurality of grooves 120 are formed at periphery of the glass plate 100. The plurality of grooves 120 are formed on all corners of the concave portion 110. Not shown, the plurality of grooves 120 may be formed on at least a corner of the concave portion 110 or at least two corners of the concave portion 110. When the plurality of grooves 120 are formed on the two corners of the concave portion 110, the two corners are opposite to each other. The concave portion 110 and the plurality of grooves are partially overlapped. The plurality of fixing elements 130 are inserted in the plurality of grooves 120. The plurality of fixing elements 130 includes an inserted portion, not shown, and a head portion, not numbered. The inserted portion is inserted in the concave portion 110 so that the plurality of fixing elements 130 are fixed to the glass plate 100. The head portion is partially overlapped with the flexible substrate 150 so that the flexible substrate 150 is fixed to the glass plate 100. The plurality of fixing elements 130 are made of material that does not make scratches on the flexible substrate 150 and are adequate to an ambient of the process. The plurality of fixing elements 130 may be made of teflon.

In words, the flexible substrate 150 is disposed in the concave portion 110 and the plurality of fixing elements 130 are inserted in the plurality of grooves 120, and thereby fixing the flexible substrate 150 to the glass plate 100. The flexible substrate 150 fixed to the glass plate 100 is transferred to the process line of fabricating the LCD device.

Figure 3A:
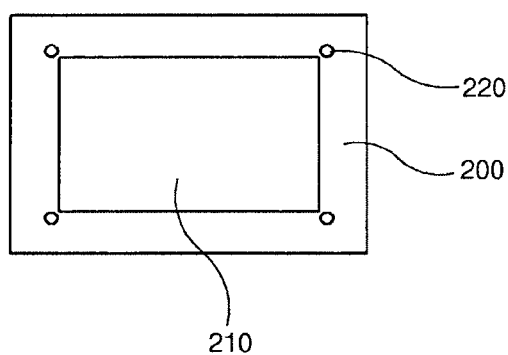
FIGS. 3A and 3B are a schematic plane views and a schematic cross-sectional view showing a jig according to another exemplary embodiment of the present invention.
Figure 3B:
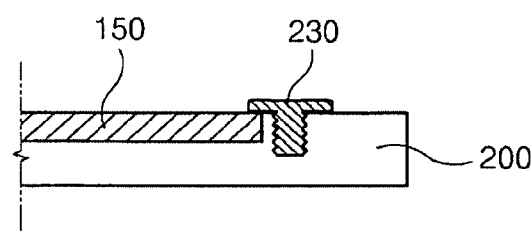

FIGS. 3A and 3B are plane view and cross-sectional views of a jig for a flexible substrate according to another embodiment of the present invention. As shown in FIGS. 3A and 3B, the jig includes the glass plate 200 and a plurality of fixing bolt 230. The glass plate 200 has a concave portion 210 and a plurality of grooves 220. The concave portion 210 and the plurality of grooves 220 may be formed on the glass plate 200 by simultaneously etching the glass plate 200. The concave portion 210 has substantially the same shape and area as the flexible substrate 150 so that the flexible substrate 150 is disposed in the concave portion 210. The plurality of grooves 220 have a nut shape and are formed at the periphery of the glass plate 200. The plurality of grooves 220 are formed on all corners of the concave portion 210 and spaced apart from the concave portion 210 to prevent the plurality of fixing bolt 230 scratching the flexible substrate 150.

Not shown, the plurality of grooves 220 may be formed on at least two corners of the concave portion 210. When the plurality of grooves 220 are formed on the two corners of the concave portion 210, the two corners are opposite to each other. The plurality of fixing bolt 230 are slipped through the plurality of grooves 220 so that a bolt head can fasten the flexible substrate 150 to the glass plate 200. The plurality of fixing bolt 230 are made of material that does not make scratches on the flexible substrate 150 and is adequate to an ambient of the process. The plurality of fixing bolt 230 may be made of one of glass and teflon.

As in the above-mentioned structure, the jig fixes and transfers the flexible substrate. The flexible substrate 150 is disposed in the concave portion 210 and the plurality of fixing bolt 230 are slipped through the plurality of grooves 220, and thereby fixing the flexible substrate 150 to the glass plate 200. The flexible substrate 150 fixed to the glass plate 200 is transferred to the process line of fabricating the LCD device.

Figure 4:
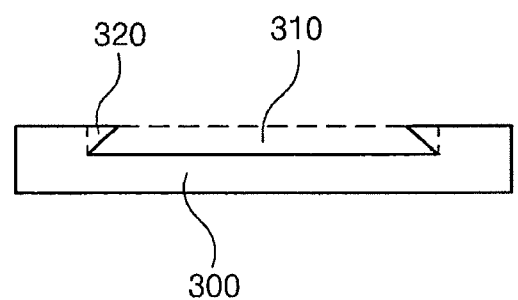
FIG. 4 is a schematic cross-sectional view showing a jig according to another exemplary embodiment of the present invention.

FIG. 4 is a cross-sectional view of a jig for a flexible substrate according to another exemplary embodiment of the present invention. As shown in FIG. 4, the jig includes the concave portion 310 on the glass plate 300 and a plurality of protrusions 320 on sidewalls of the concave portion 310. The concave portion 310 has substantially the same shape and area as the flexible substrate (not shown) by etching the glass plate 300. The plurality of protrusions 320 are formed on at least two sidewalls of the concave portion 310 and protrude from the walls of the concave portion 310. The plurality of protrusions 320 may be formed by adding protrusions to the walls or by simultaneously etching the glass plate 300. In order to easily stick or separate the flexible substrate, a horizontal length of each protrusion 320 is between two and four millimeters and may be about 3 millimeters.

As in the above-mentioned structure, since the jig has a simple structure and makes it easy to fix and separate the flexible substrate, the process of fabricating the jig and the LCD device becomes uncomplicated.

Figure 5A:
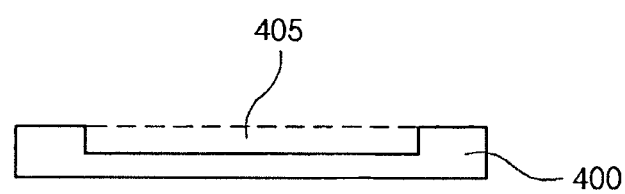
FIGS. 5A to 5C are schematic cross-sectional view and a plane view showing a jig according to another exemplary embodiment of the present invention.
Figure 5B:
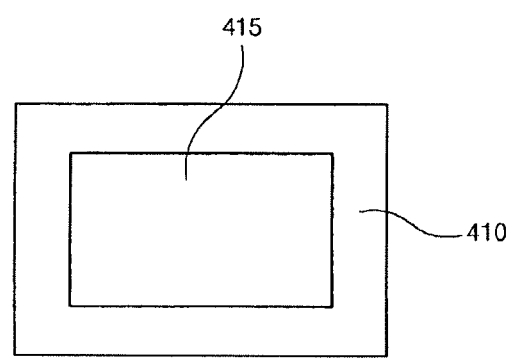
Figure 5C:
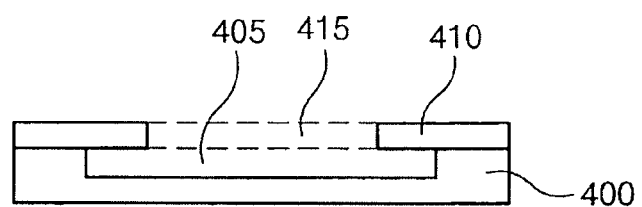

FIGS. 5A to 5C show a jig for a flexible substrate according to another exemplary embodiment of the present invention. FIG. 5A is a cross-sectional view of a lower plate, FIG. 5B is a plane view of an upper plate and FIG. 5C is a cross-sectional view of the jig. As shown in FIGS. 5A to 5C, the jig includes the lower plate 400 and the upper plate 410. The lower plate 400 has the concave portion 405 by etching the lower plate 400. The concave portion 405 has substantially the same shape and area so that the flexible substrate, not shown, is disposed in the concave portion 405. The upper plate 410 has a hole 415 at center of the upper plate 410. Since the hole 415 has a size corresponding to a processing area of the flexible substrate, the hole 415 has a smaller size than that of the concave portion 405. The lower plate 400 has three sidewalls of the concave portion 405 and a side opening (not shown). The flexible substrate passes through the side opening and then the side opening is sealed using sealant such as resin. The lower plate 400 is etched to have the concave portion 405 and the side opening, and the upper plate 410 is etched to have the hole 415. And then the lower plate 400 combines with the upper plate such that the concave portion 405 faces the upper plate 410. The flexible substrate is disposed in the concave portion 405 through the side opening and the hole 415 exposes the flexible substrate.

Figure 6A:
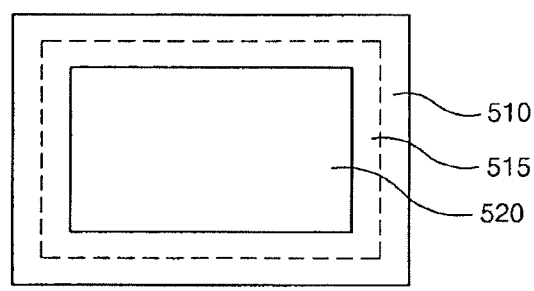
FIGS. 6A and 6B are a cross-sectional view and a plane view showing a jig according to another exemplary embodiment of the present invention.
Figure 6B:
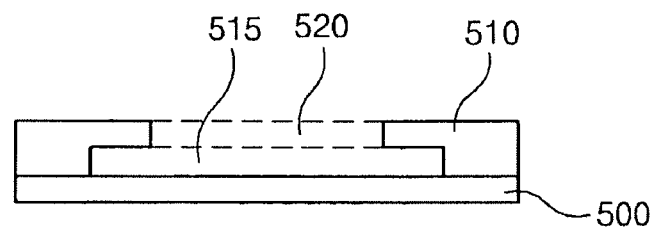

FIGS. 6A and 6B shows a jig according to another exemplary embodiment of the present invention. The jig includes the lower plate 500 and the upper plate 510. The lower plate 500 and the upper plate 510 may be made of glass. The upper plate 510 has the concave portion 515 and the hole 520. The concave portion 515 has substantially the same shape and area so that the flexible substrate, not shown, is disposed in the concave portion 515. Since the hole 520 has a size corresponding to a processing area of the flexible substrate, the hole 520 has a smaller size than that of the concave portion 515. The upper plate 510 is sequentially etched to have the hole 520 through the upper plate 510 and to have the concave portion 515. Then, the lower plate 500 combines with the upper plate 510 so that the concave portion 515 faces the lower plate 500. The upper plate 510 has three sidewalls of the concave portion 515 and a side opening (not shown). The flexible substrate passes through the side opening and then the side opening is sealed using sealant such as resin. The flexible substrate is disposed in the concave portion 515 and the hole exposes the flexible substrate.

Since the jig according to the embodiments of the present invention can fix the flexible substrate to the glass plate without the bonding agent, the process of fabricating the LCD device is simplified.

The process of fabricating the LCD device can use the above-mentioned jig. The LCD device includes a first flexible substrate, a second flexible substrate and a liquid crystal layer interposed therebetween. The first and second flexible substrates are fixed to the jigs and transferred into the process line. A process of forming a gate line, a data line, a thin film transistor and a pixel electrode on the first substrate is performed. The gate line and the data line cross each other to define the pixel region. The thin film transistor is formed at a crossing portion of the gate and data lines and has a semiconductor layer, a gate electrode, a source electrode and a drain electrode. The pixel electrode is formed on the pixel region and is connected to the drain electrode. A storage capacitor may be formed on the first substrate.

The second flexible substrate includes a black matrix, a color filter layer and a common electrode. The color filter layer includes red, green and blue sub-color filters. The black matrix covers a non-display region including a portion of the gate line, the data line and the thin film transistor. The common electrode is formed corresponding to the pixel electrode such that an electric filed is generated between the common and pixel electrodes. The electric field between the common and pixel electrode drive the liquid crystal layer such that the LCD device displays images.

It will be apparent to those skilled in the art that various modifications and variations can be made in the substrate for the liquid crystal display device and the method of fabricating the same of the present invention without departing from the spirit or scope of the invention. Thus, it is intended that the present invention covers the modifications and variations of this invention provided they come within the scope of the appended claims and their equivalents.

The invention claimed is:

1. A jig for fixing a flexible substrate and transferring the flexible substrate into a process line, comprising:
a lower plate, which has a concave portion and an opening at a sidewall of the concave portion; and
an upper plate, which has a hole of a smaller size than the concave portion,
wherein the lower plate combines with the upper plate such that the concave portion faces the upper plate, and a distance between the upper and lower plate is substantially the same as a thickness of the flexible substrate.

2. A method of fabricating a jig for a flexible substrate, comprising:
forming a concave portion in a lower plate;
forming an opening at a sidewall of the concave portion;
forming a hole in an upper plate corresponding to the concave portion; and
combining the lower plate with the upper plate such that the concave portion faces the hole,
wherein a distance between the upper and lower plate is substantially the same as a thickness of the flexible substrate, and the hole has a size smaller than the concave portion.

* * * * *